(12) United States Patent
Lever et al.

(10) Patent No.: US 11,550,043 B2
(45) Date of Patent: Jan. 10, 2023

(54) SPATIALLY AND TEMPORALLY COHERENT MULTI-LIDAR POINT CLOUD FUSION

(71) Applicant: Samsung Electronics Co., Ltd., Suwon-si (KR)

(72) Inventors: Gweltaz Fanch Paul Lever, Mountain View, CA (US); Elham Sakhaee, Union City, CA (US); Farshid Moussavi, Oakland, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 431 days.

(21) Appl. No.: 16/833,468

(22) Filed: Mar. 27, 2020

(65) Prior Publication Data

US 2021/0215805 A1    Jul. 15, 2021

Related U.S. Application Data

(60) Provisional application No. 62/960,618, filed on Jan. 13, 2020.

(51) Int. Cl.
| | | |
|---|---|---|
| *G01S 7/4865* | (2020.01) | |
| *G01S 17/894* | (2020.01) | |
| *G01S 7/481* | (2006.01) | |

(52) U.S. Cl.
CPC .......... *G01S 7/4865* (2013.01); *G01S 7/4817* (2013.01); *G01S 17/894* (2020.01)

(58) Field of Classification Search
CPC ..... G01S 7/4865; G01S 7/4817; G01S 17/894
See application file for complete search history.

(56) References Cited

U.S. PATENT DOCUMENTS

| | | |
|---|---|---|
| 10,445,928 B2 | 10/2019 | Nehmadi et al. |
| 2015/0169244 A1 | 6/2015 | Asnaashari et al. |
| 2018/0188371 A1 | 7/2018 | Boa et al. |

(Continued)

OTHER PUBLICATIONS

Varga, R., et al., "Super-sensor for 360-degree Environment Perception: Point Cloud Segmentation Using Image Features," Computer Science Department, Technical University of Cluj-Napoca, Romania, 8 pages.

(Continued)

*Primary Examiner* — Thanh Luu
(74) *Attorney, Agent, or Firm* — Lewis Roca Rothgerber Christie LLP

(57) ABSTRACT

A scanning system includes a plurality of light detection and ranging (LiDAR) sensors, each LiDAR sensor of the plurality of LiDAR sensors being configured to generate a point cloud based on interactions of emitted light with a surrounding environment, and a processor configured to split a full 360° rotation of each LiDAR sensor into a plurality of slices including a first slice and a second slice, to generate a coherent fused point cloud by fusing together portions of point clouds of the plurality of LiDAR sensors corresponding to the first slice, and fusing together portions of point clouds of the plurality of LiDAR sensors corresponding to the second slice, to determine an action for the scanning system to take in response to the generation of the coherent fused point cloud, and to cause the scanning system to implement the action.

18 Claims, 13 Drawing Sheets
(9 of 13 Drawing Sheet(s) Filed in Color)

(56) References Cited

U.S. PATENT DOCUMENTS

2019/0064364 A1      2/2019   Boysel et al.
2020/0249353 A1*   8/2020   Di Cicco .............. G01S 7/4808

OTHER PUBLICATIONS

Sualeh, M., et al., "Dynamic Multi-LiDAR Based Multiple Object Detection and Tracking," MDPI, Sensors, 2019, 19, 1474; doi:10.3390/ s19061474, 20 pages.

* cited by examiner

SPATIALLY AND TEMPORALLY COHERENT MULTI-LIDAR POINT CLOUD FUSION

CROSS-REFERENCE TO RELATED APPLICATION(S)

This application claims priority to, and the benefit of, U.S. Provisional Application No. 62/960,618 ("SPATIALLY AND TEMPORALLY COHERENT MULTI-LIDAR POINT CLOUD FUSION"), filed on Jan. 13, 2020, the entire content of which is incorporated herein by reference.

FIELD

Aspects of embodiments of the present disclosure are generally related to three-dimensional perception using point cloud data.

BACKGROUND

Generally, technical areas such as autonomous driving, robotics, and advanced driver-assistance (ADAS) systems rely on three-dimensional perception capabilities. The understanding of where an object is located in the world with respect to the robotic or autonomous driving platform is crucial for the decision making. Moreover, such information may only be valuable if one can associate an accurate timestamp to the localization of an object. Given a state of the world and a time, the prediction module can determine how agents in a scene are behaving, thus allowing the decision-making module to maneuver safely (or, e.g., inform the driver of potential hazards) in the environment.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure are directed to a system and method for assuring spatio-temporal consistency between sensors of a multi-LiDAR system to achieve accurate fused multi-LiDAR point clouds.

According to some embodiments of the present disclosure, there is provided a scanning system including: a plurality of light detection and ranging (LiDAR) sensors, each LiDAR sensor of the plurality of LiDAR sensors being configured to generate a point cloud based on interactions of emitted light with a surrounding environment; and a processor configured to split a full 360° rotation of each LiDAR sensor into a plurality of slices including a first slice and a second slice, to generate a coherent fused point cloud by fusing together portions of point clouds of the plurality of LiDAR sensors corresponding to the first slice, and fusing together portions of point clouds of the plurality of LiDAR sensors corresponding to the second slice, to determine an action for the scanning system to take in response to the generation of the coherent fused point cloud, and to cause the scanning system to implement the action.

In some embodiments, the processor is configured to generate the coherent fused point cloud by: assigning a first timestamp to the portions of the point clouds of the plurality of LiDAR sensors corresponding to the first slice; and assigning a second timestamp to the portions of the point clouds of the plurality of LiDAR sensors corresponding to the second slice.

In some embodiments, separately fusing together portions of the point clouds of the plurality of LiDAR sensors corresponding to the first slice and the second slice includes: fusing together ones of the point clouds associated with the first timestamp; and separately fusing together ones of the point clouds associated with the second timestamp.

In some embodiments, the first slice of each LiDAR sensor is earlier in rotation that the second slice, and wherein the processor is configured to process the portions of the point clouds corresponding to the first slice, while the plurality of LiDAR sensors are capturing the portions of the point clouds corresponding to the second slice.

In some embodiments, the scanning system further includes: a controller configured to control trigger times of rotations of the plurality of LiDAR sensors, and to phase lock first ones of the plurality of LiDAR sensors and to phase lock second ones of the plurality of LiDAR sensors.

In some embodiments, the controller is configured to phase lock the first ones of the plurality of LiDAR sensors at a substantially same phase angle and to phase lock the second ones of the plurality of LiDAR sensors at a substantially same phase angle.

In some embodiments, at any given time, the first ones of the plurality of LiDAR sensors face in a first direction and the second ones of the plurality of LiDAR sensors face a second direction substantially opposite the first direction.

In some embodiments, at any given time, the first and second ones of the plurality of LiDAR sensors face in a substantially same direction.

In some embodiments, the plurality of LiDAR sensors are positioned at at least two corners of the scanning system.

In some embodiments, the scanning system includes a vehicle, and the first and second slices respectively correspond to a front side and a rear side of the vehicle.

In some embodiments, the scanning system includes a vehicle, and the first and second slices respectively correspond to a left side and a right side of the vehicle.

According to some embodiments of the present disclosure, there is provided a scanning system including: a platform; a plurality of light detection and ranging (LiDAR) sensors mounted on the platform, each LiDAR sensor of the plurality of LiDAR sensors being configured to generate a point cloud based on interactions of emitted light with a surrounding environment; a controller configured to control trigger times of rotations of the plurality of LiDAR sensors; and a processor configured to split a full 360° rotation of each LiDAR sensor into a plurality of slices including a first slice and a second slice, and to generate a coherent fused point cloud by fusing together portions of point clouds of the plurality of LiDAR sensors corresponding to the first slice, and fusing together portions of point clouds of the plurality of LiDAR sensors corresponding to the second slice.

In some embodiments, the processor is configured to generate the coherent fused point cloud by: assigning a first timestamp to the portions of the point clouds of the plurality of LiDAR sensors corresponding to the first slice; and assigning a second timestamp to the portions of the point clouds of the plurality of LiDAR sensors corresponding to the second slice.

In some embodiments, separately fusing together portions of the point clouds of the plurality of LiDAR sensors corresponding to the first slice and the second slice includes: fusing together ones of the point clouds associated with the first timestamp; and separately fusing together ones of the point clouds associated with the second timestamp.

In some embodiments, the first slice of each LiDAR sensor is earlier in rotation that the second slice, and wherein the processor is configured to process the portions of the point clouds corresponding to the first slice, while the plurality of LiDAR sensors are capturing the portions of the point clouds corresponding to the second slice.

In some embodiments, the controller is further configured to phase lock first ones of the plurality of LiDAR sensors at a substantially same phase angle and to phase lock second ones of the plurality of LiDAR sensors at a substantially same phase angle.

In some embodiments, at any given time, the first ones of the plurality of LiDAR sensors face in a first direction and the second ones of the plurality of LiDAR sensors face a second direction substantially opposite the first direction.

In some embodiments, at any given time, the first and second ones of the plurality of LiDAR sensors face in a substantially same direction.

According to some embodiments of the present disclosure, there is provided a method of generating a coherent fused point cloud by a scanning system including a plurality of light detection and ranging (LiDAR) sensors, the method including: splitting a full 360° rotation of each LiDAR sensor of the plurality of LiDAR sensors into a plurality of slices including a first slice and a second slice, each LiDAR sensor being configured to generate a point cloud based on interactions of emitted light with a surrounding environment; and generating a coherent fused point cloud by separately fusing together portions of the point clouds of the plurality of LiDAR sensors corresponding to the first slice and the second slice.

In some embodiments, the method further includes: phase locking first ones of the plurality of LiDAR sensors at a substantially same phase angle and phase locking second ones of the plurality of LiDAR sensors at a substantially same phase angle, wherein the first and second ones of the plurality of LiDAR sensors face in a substantially same direction or in substantially opposite directions.

BRIEF DESCRIPTION OF THE DRAWINGS

The patent or application file contains at least one drawing executed in color. Copies of this patent or patent application publication with color drawings will be provided by the Office upon request and payment of the necessary fee.

The accompanying drawings, together with the specification, illustrate example embodiments of the present disclosure, and, together with the description, serve to explain the principles of the present disclosure.

DETAILED DESCRIPTION

Figures 1A, 1B, 2A, 2B:
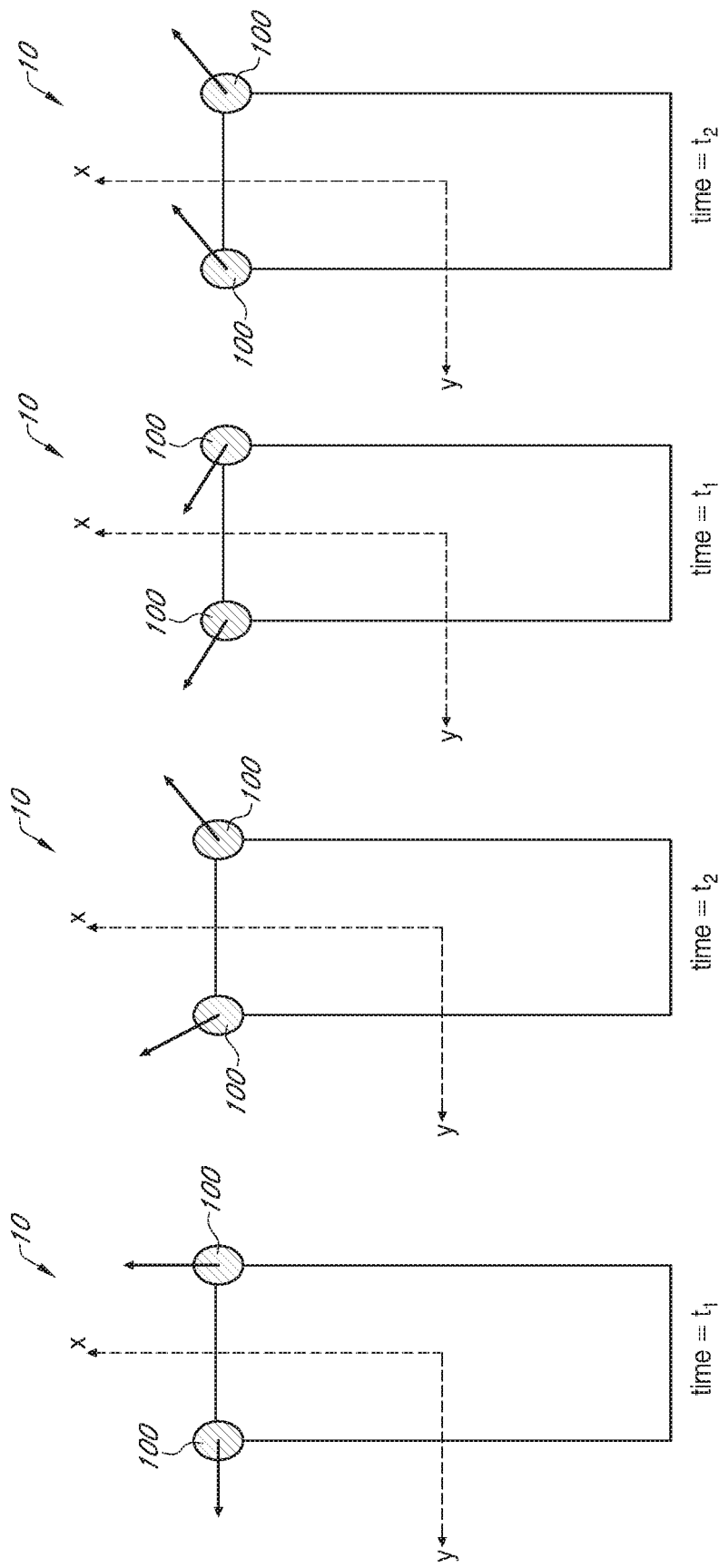
FIGS. 1A and 1B respectively illustrate a scanning system including two LiDAR sensors that are phase locked at 90 degrees at a first rotation time and a second rotation time.
FIGS. 2A and 2B respectively illustrate a scanning system including two LiDAR sensors that are phase locked at zero degrees at a first rotation time and a second rotation time.

The detailed description set forth below is intended as a description of example embodiments of a system and method for generating a coherent fused point cloud in a multi-LiDAR system, provided in accordance with the present disclosure, and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

To permit a three-dimensional understanding of the environment, autonomous platforms may be equipped with multiple sensors. Since spatial and temporal accuracy is desired to act, any inconsistencies resulting from sensor disagreements can have a catastrophic impact on the vehicle's decisions.

A light detection and ranging (LiDAR) device is a time-of-flight laser-based scanning device that emits multiple beams at high frequency and concurrently receives returns as beams hit objects. LiDAR may return between 200,000 and 1,000,000 points per second. The collection of points obtained from laser beam returns bouncing on surrounding objects may be referred to as a point cloud. One commonly used type of LiDAR is a spinning device that generates a 360-degrees point cloud of the surroundings of the vehicle at 10 Hz to 20 Hz. In order to get a complete coverage of the environment close to the platform and at greater distance, multiple sensors may be mounted onto a single platform. A great challenge is to merge data received by multiple sensors, which may be of different type and placed at different locations on the platform, both in time and in space. This may be referred to as sensor fusion. Naively starting the sensors and capturing a 360 degrees output will lead to an inconsistent fused point cloud, as vehicles hit by the laser beams may be seen at different times and in different locations by the various LiDAR sensors. To compensate for these shortcomings, it is desirable to address two issues: the spatial static consistency and the dynamic spatio-temporal consistency of the Lidar points.

The static spatial consistency can be addressed through calibration of the sensors, that is, by determining precisely the location of the sensors relative to each other. In a perfectly static scene, proper calibration of sensors will allow the points captured by each LiDAR to be transformed into a common reference frame in order to create a coherent fused point cloud.

However, as soon as objects are dynamic and have relative motion with regard to the platform, which may be the case in robotics applications, the various LiDAR sources don't receive returns off the objects at the same time. This issue may be referred to as dynamic spatio-temporal inconsistency. The LiDARs may capture information while spinning over a period of 50 ms to 100 ms (i.e., 20 Hz or 10 Hz). During that time lapse, objects might have moved by a few meters depending on their relative speed. Indeed, a vehicle driving in the opposite direction of traffic with respect to the sensor platform at an urban speed of 25 mph (relative speed between the two vehicles may be 50 mph) may have moved relative to the sensor 2.24 meters in 100 ms. At highway speeds, the relative position of the vehicle with respect to the sensor may, for example, change by 5.8 meters in the same amount of time. Hence if a first sensor sees an object at the beginning of its rotation (spin) and second sensor sees it at the end of the rotation and the two point clouds are fused together, one will get a smeared effect or a ghosting effect: a car bumper for instance will appear twice at different locations in the fused point cloud.

Thus, some embodiments of the present disclosure are directed to a system and method for resolving or improving the spatio-temporal inconsistency in sensor fusion of robotic platforms to achieve accurate fused multi-LiDAR point clouds. According to some embodiments, the system is capable of providing a coherent spatial and temporal fused point cloud output by phase-locking light detection and ranging (LiDAR) sensors at precisely calibrated cut angles, that is, the position at which the revolution (spin) for the point cloud capture is initiated, and by splitting the LiDAR point clouds in time to prevent points in a region captured at overly different times to be associated with the same timestamp. Accordingly, the system increases the point cloud output frequency, and reduces the latency in the pipeline by processing LiDAR points before the end of a rotation. Herein, a point cloud is a collection of points that represent a 3D shape or feature. Each point has its own set of X, Y and Z coordinates and, in some examples, has an associated timestamp recording time of capture.

Hereinafter, the cut angle of a spinning LiDAR refers to the direction at which the capture of each new point cloud starts. In some examples, the LiDAR may capture a full 360 degrees point cloud from cut angle over a period of 50 ms, when the device rotates at 20 Hz, or a period of 100 ms, when it rotates at 10 Hz. Further, phase locking two LiDARs refers to setting (and fixing) the cut angle of one sensor at a relative angle with respect to the cut angle of the other sensor (e.g. when the two LiDARs have same or similar rotation frequencies, such as frequencies within 5 Hz or less of each other, within 2 Hz or less of each other, within 1 Hz or less of each other, or within 0.5 Hz or less of each other). Thus, once two sensors are phase locked, the direction in which a LiDAR sensor points to can be determined, at any point in time, by knowing the direction in which the other LiDAR sensor points to at that time. When, the relative phase is set to 0 degrees, the two LiDAR sensors have the same angle.

FIGS. 1A and 1B respectively illustrate a scanning system 10 including two LiDAR sensors 100 that are phase locked at 90 degrees at a first rotation time t1 and a second rotation time t2. FIGS. 2A and 2B respectively illustrate a scanning system 10 including two LiDAR sensors 100 that are phase locked at zero degrees at a first rotation time t1 and a second rotation time t2.

As each spinning LiDAR sensor 100 provides small packets of points, the scanning system 10, can collect a full rotation of points and consume the full 360 degrees point cloud, or the the scanning system 10 can, according to some embodiments, collect slices of the 360 degrees and timestamp these intermediate slices individually. The creation of intermediate slices is referred to herein as the splitting of the LiDAR point cloud. Performing one slice/split results in outputting two hemispheres of points, and performing two slices results in three thirds of a sphere of points, in some embodiments in which the slices are of equal or similar size. In other embodiments, the slices are not of equal or similar size.

Figure 3:
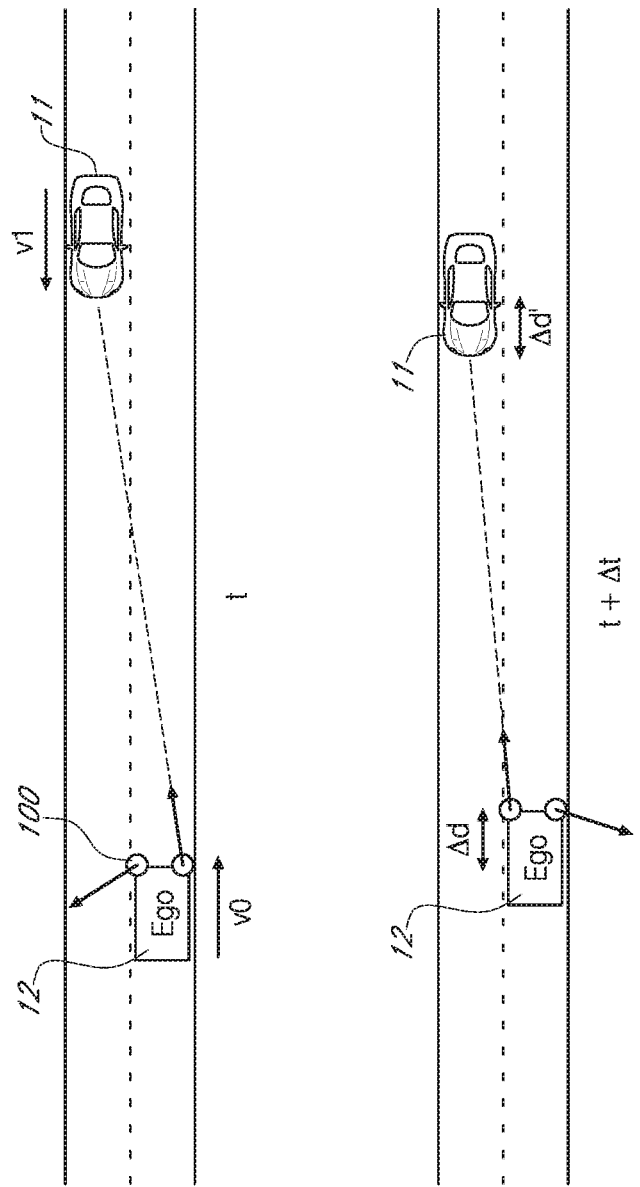
FIG. 3 illustrates a related-art LiDAR scanning of an object with relative motion between the object and a multi-LiDAR vehicle resulting in spatio-temporal inconsistencies between the different LiDARs of the multi-LiDAR vehicle.

FIG. 3 illustrates a related-art LiDAR scanning of an object 11 with relative motion between the object 11 and a multi-LiDAR vehicle 12 resulting in spatio-temporal inconsistencies between the different LiDARs of the multi-LiDAR vehicle.

Referring to FIG. 3, a multi-LiDAR vehicle 12 of the related art may be equipped with multiple sensors (e.g., two LiDAR sensors) 100 that are not phase locked, or where a phase lock between the multiple sensors is not appropriately tuned and/or where the phase difference is not appropriately compensated for in processing of the sensor data. In a dynamic scene, such as when there is relative motion between an object 11 (e.g., an incoming vehicle) and the platform, because the LiDAR sensors 100 can be pointing at different locations at different times, they may observe a region or the object at different times. As a result, instead of obtaining the same crisp boundaries of an object as may be the case with a single LiDAR sensor 100, the object 11 may appear as having a shadow of points.

Figure 4A:
FIG. 4A illustrates an example of the related art in which fused point clouds are obtained from 5 different LiDAR sensors for a given scene, and the sensed car boundaries exhibit shadowing effects.
Figure 4B:
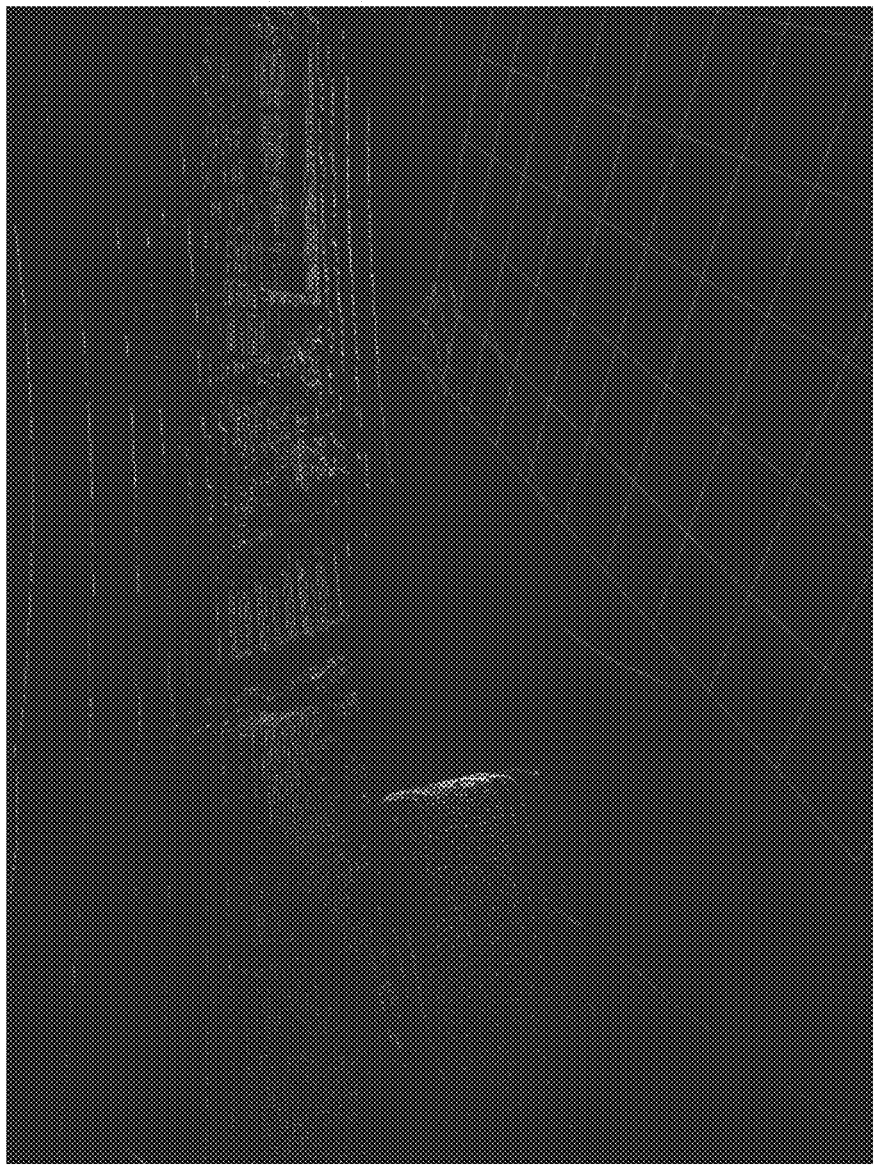
FIG. 4B illustrates a comparative example in which a point cloud is obtained from a single LiDAR sensor for the same scene, and the sensed car boundaries do not exhibit any shadowing effect.

FIG. 4A illustrates an example of the related art in which fused point clouds are obtained from 5 different LiDAR sensors for a given scene, and the sensed car boundaries exhibit shadowing effects. FIG. 4B illustrates a comparative example in which a point cloud is obtained from a single LiDAR sensor for the same scene, and the sensed car boundaries do not exhibit any shadowing effect. In FIG. 4A, each color represents a different LiDAR sensor.

As illustrated in FIG. 4A, the shadowing effect (e.g., the 3-4 boundaries of the back car shown in regions A and B of FIG. 4A) may make it difficult to precisely determine a location of an object given a timestamp, at a particular point.

The uncertainty resulting from the shadowing effect may propagate into an algorithm that uses it as well as the annotation of the data in the case of supervised algorithms. Furthermore, the location of the LiDAR sensors on the multi-LiDAR vehicle may influence the artifact shapes that are generated. As a result, it may be difficult to train an algorithm on one dataset and then to generalize to another dataset, because the uncertainty may depend on the setup.

Another noticeable artifact that may appear when doing fusion of data from non-phase locked sensors is related to discontinuities at the boundary of a split. Because points on one side of the split boundary have been collected at the beginning of the LiDAR rotation and points at the other side of the split boundary have been collected at the end of the rotation, discontinuous object shapes may be observed when there is relative motion between the LiDAR sensor and the object.

Figure 5:
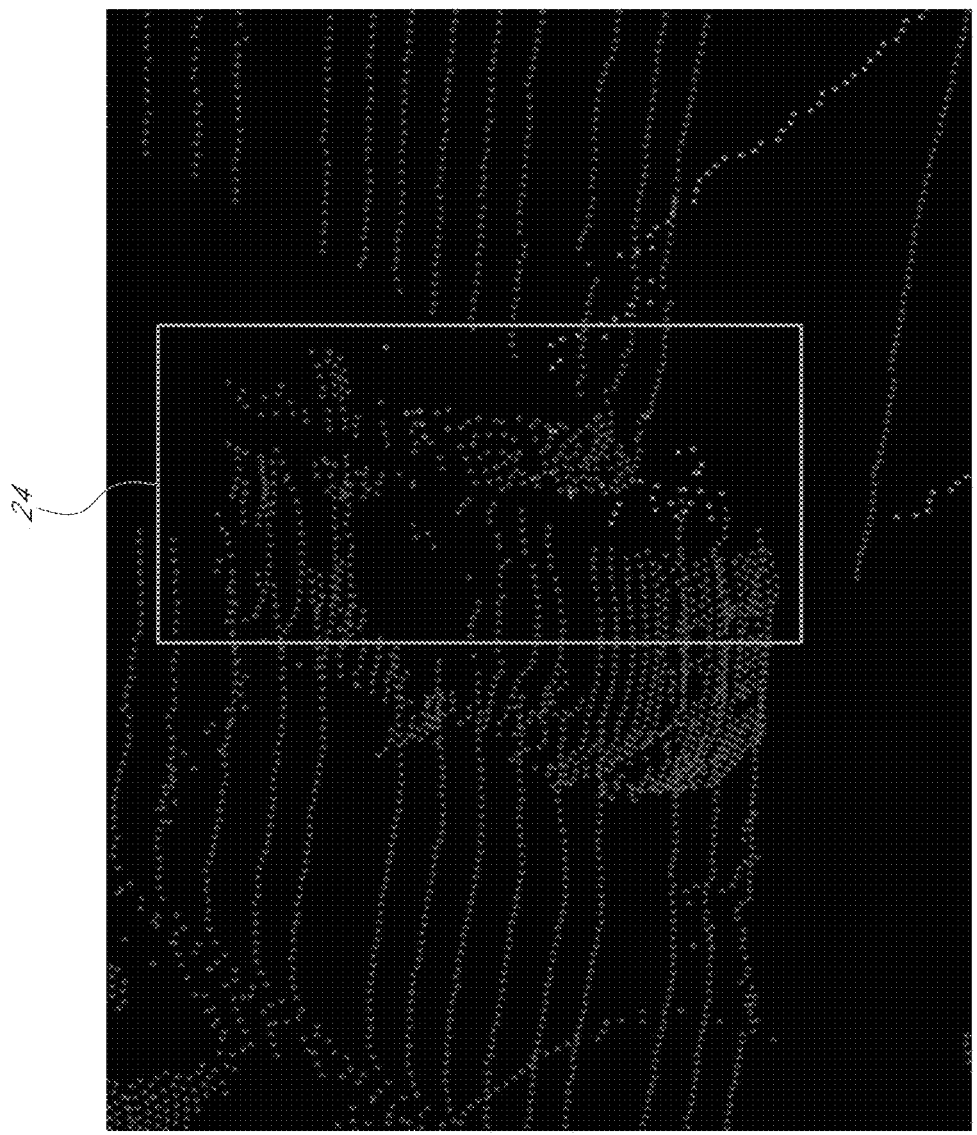
FIG. 5 illustrates an artifact at the cut angle boundary, which is at the rear of a vehicle and parallel to the vehicle motion.
Figure 6:
FIG. 6 illustrates an artifact at the cut angle boundary, which is perpendicular to vehicle motion and to the left.
Figure 6:

FIG. 5 illustrates an artifact 24 at the cut angle boundary, which is at the rear of a vehicle and parallel to the vehicle motion. FIG. 6 illustrates an artifact at the cut angle boundary, which is perpendicular to vehicle motion and to the left. In FIG. 6, each color represents a different LiDAR sensor 100.

In the example of FIG. 5, the discontinuity artifact 24 appears in the rear area of the multi-LiDAR vehicle 12 and an approaching car is split along the X direction. In other examples, such as the example of FIG. 6, when the cut angle is set perpendicular to the motion of the multi-LiDAR vehicle 12 (e.g., set to the side of the multi-LiDAR vehicle 12, e.g., along the Y axis), the artifacts may be less predictable as the observed shapes of surrounding objects are more impacted by the motion of the multi-LiDAR vehicle, and can result in more than a sliding (or perceived discontinuity) of half of the object. The artifacts observed in this case correspond to a similar shadowing effect but in the width direction of the cars. Hence, the pickup truck may appear to be 50 cm or 1 meter wider than it actually is. Similarly, the car to the left of the pickup truck may appear deformed. Inaccurate measurements like these could prevent the multi-LiDAR vehicle 12 from, for example, finding a parking spot next to that car.

Figure 7A:
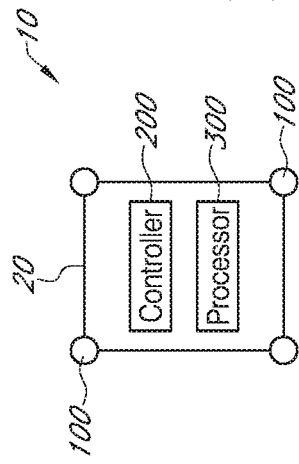
FIG. 7A illustrates a scanning system for generating a coherent fused LiDAR point cloud, according to some embodiments of the present disclosure.

FIG. 7A illustrates a scanning system 10 for generating a coherent fused LiDAR point cloud, according to some embodiments of the present disclosure.

According to some embodiments, the scanning system 10 includes a platform (e.g., a vehicle or a robotic platform) 20, a plurality of LiDAR sensors 100 positioned at various points on or in the platform 20, a controller 200 (also referred to as a synchronization module or control circuit) configured to control the motion (e.g., rotation) and trigger times of the LiDAR sensors 100, and a processor (e.g., a processor circuit) 300 for processing the data received from each LiDAR sensor, which may represent at least a slice of the full 360 degrees point cloud. As used herein, references to the motion or rotation of a LiDAR sensor can refer to physical movement of the sensor itself (or one or more components thereof), or can refer to movement or rotation of a volume, area, or region sensed by the LiDAR sensor. The controller 200 operates each LiDAR sensor 100 such that a 360 degrees rotation of the LiDAR sensor 100 is split into a plurality of slices. Because each slice represents a shorter time interval than a full 360 degrees rotation, a rotation slice effectively reduces the spatio-temporal inconsistency described above. Thus, the scanning system 10 can eliminate artifacts caused by drastically different time captures in areas around the platform 20, for instance at the cut angle locations. According to some embodiments, the processor 300 is configured to split a full 360° rotation of each LiDAR sensor 100 into a plurality of slices including a first slice and a second slice, and to generate a coherent fused point cloud by separately fusing together portions of point clouds of the LiDAR sensors 100 corresponding to the first slice and second slice. In so doing, the processor 300 may assign a first timestamp to the portions of the point clouds of the LiDAR sensors 100 that correspond to the first slice, and assign a second timestamp to the portions of the point clouds corresponding to the second slice. The processor may then fuse together ones of the point clouds associated with the first timestamp, and separately fuse together ones of the point clouds associated with the second timestamp. This allows the processor 300 or any downstream algorithm to process the portions of the point clouds corresponding to the first slice, while the LiDAR sensors 100 are capturing the portions of the point clouds corresponding to the second slice, which improves pipelining.

The point cloud may then be used by various modules of the perception pipeline. One such module may be the clustering algorithm. Given an input point cloud covering part of the environment around the scanning system 10, the clustering algorithm may identify point clusters corresponding to other agents (vehicles, pedestrians, obstacles) and determine their shape, location, and orientation. Another such module may be a deep-learning-based 3D object detection algorithm that may try to obtain similar output from the point cloud with the additional capability of determining the type of object looked at. The clusters may then be passed on to a tracking algorithm that may try to add temporal information to these measurements, as the system may have a sense of where the object currently is but want to understand how it's moving by combining that information with prior measurements of the same object. This may then be used to predict an agent's trajectory and act accordingly.

A different scenario may be to use the coherent points gathered to estimate the road surface (e.g., shape or inconsistencies on the ground). By having coherent lidar points, one has better chances at determining the manifold on which the points lie. The road surface information may then be used by the vehicle controller to, for example, slow down ahead of a speed bump or accelerate more when on a hill than when on a flat road.

In some embodiments, the controller 200 phase locks ones of the LiDAR sensors 100 that cover a common slice of the rotation at a same phase angle (e.g., a zero-degree angle) to allow for spatio-temporal consistency. Given that the locations of the LiDAR sensors 100 on the scanning system 10 may be different, having the same phase angle does not necessarily guarantee that each LiDAR observes every region simultaneously, but reduces the time lapse between two LiDAR captures. In some embodiments, LiDAR sensors that do not cover the same slice may not be phase locked at the same angle (e.g., may be phase locked at different angles). The controller 200 is configured to trigger the rotation of all LiDAR sensors 100 substantially simultaneously for all of the slices. The processor 300 fuses point clouds originating from various LiDAR sensors over a single slice/phase of the rotation for further processing.

Slicing the 360 degrees rotation and phase-locking sensors covering the same slice at zero degrees, according to some embodiments, not only address both types of artifacts described above (the shadowing and discontinuity artifacts) but also provide the following additional benefits: 1) they reduce the latency in the pipeline as the processor 300 can process a slice of the point cloud rather than waiting for the full 360 degree rotation to be completed, which can be valuable in real-time applications, such as autonomous driving, 2) they allow for smaller point clouds to be processed by the processor and/or any other downstream algorithm, and 3) allow for more accurate timestamping of the captured cloud points. In effect, rotational slicing and phase-locking sensors covering the same slice smooths out the workload of the processor and reduces the bandwidth taken by the LiDAR sensors 100.

Figure 7C:
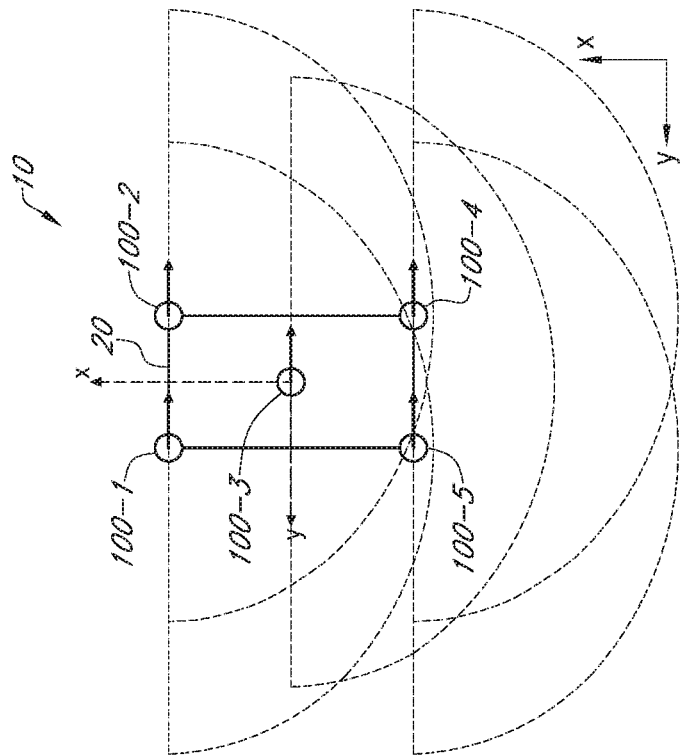
FIG. 7C illustrates a second phase of the single-phase angle LiDAR split during which all LiDAR sensors are facing in the opposite direction, according to some embodiments of the present disclosure.
Figure 7B:
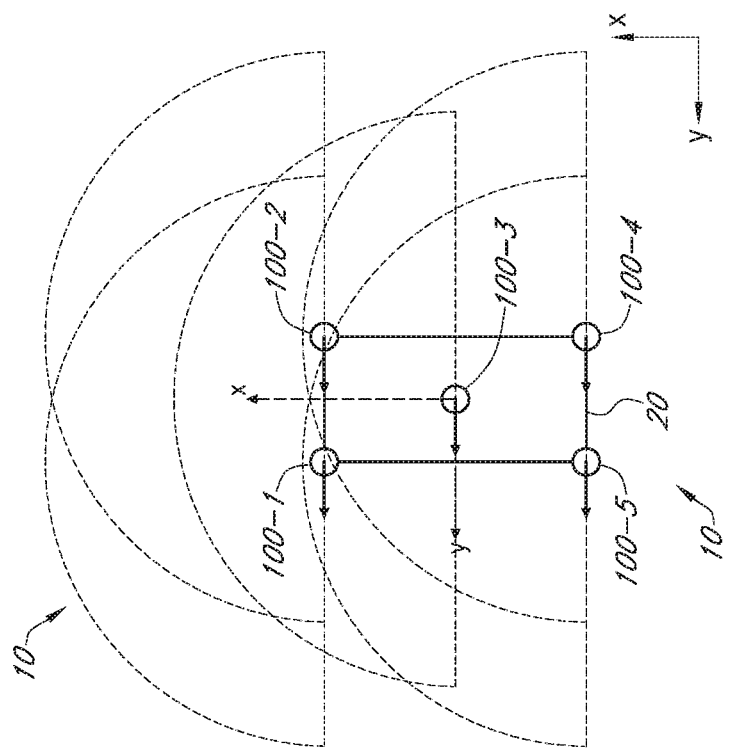
FIG. 7B illustrates a first phase of a single-phase angle LiDAR split during which all LiDAR sensors are facing in a same direction, according to some embodiments of the present disclosure.
Figure 8A:
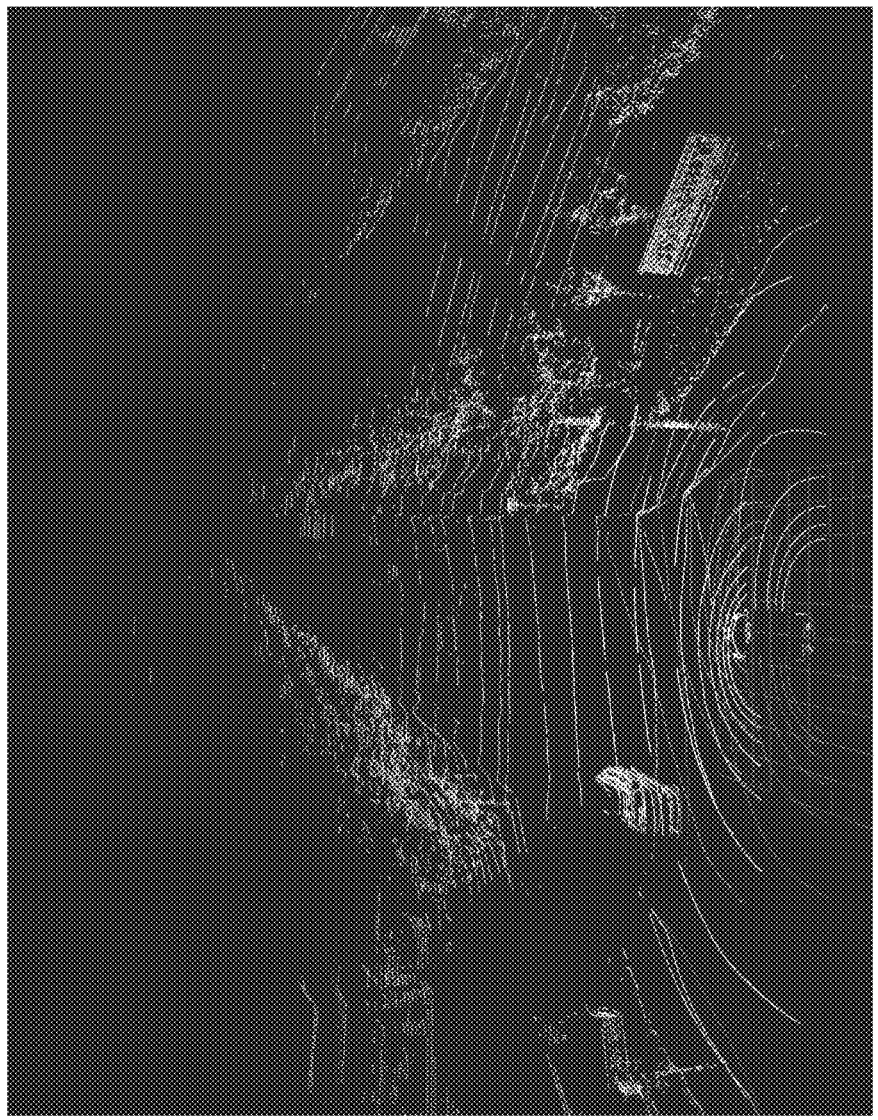
FIGS. 8A and 8B illustrate the captured cloud point during the first phase and the second phase, respectively, of the LiDAR rotation, according to some embodiments of the present disclosure.
Figure 8B:
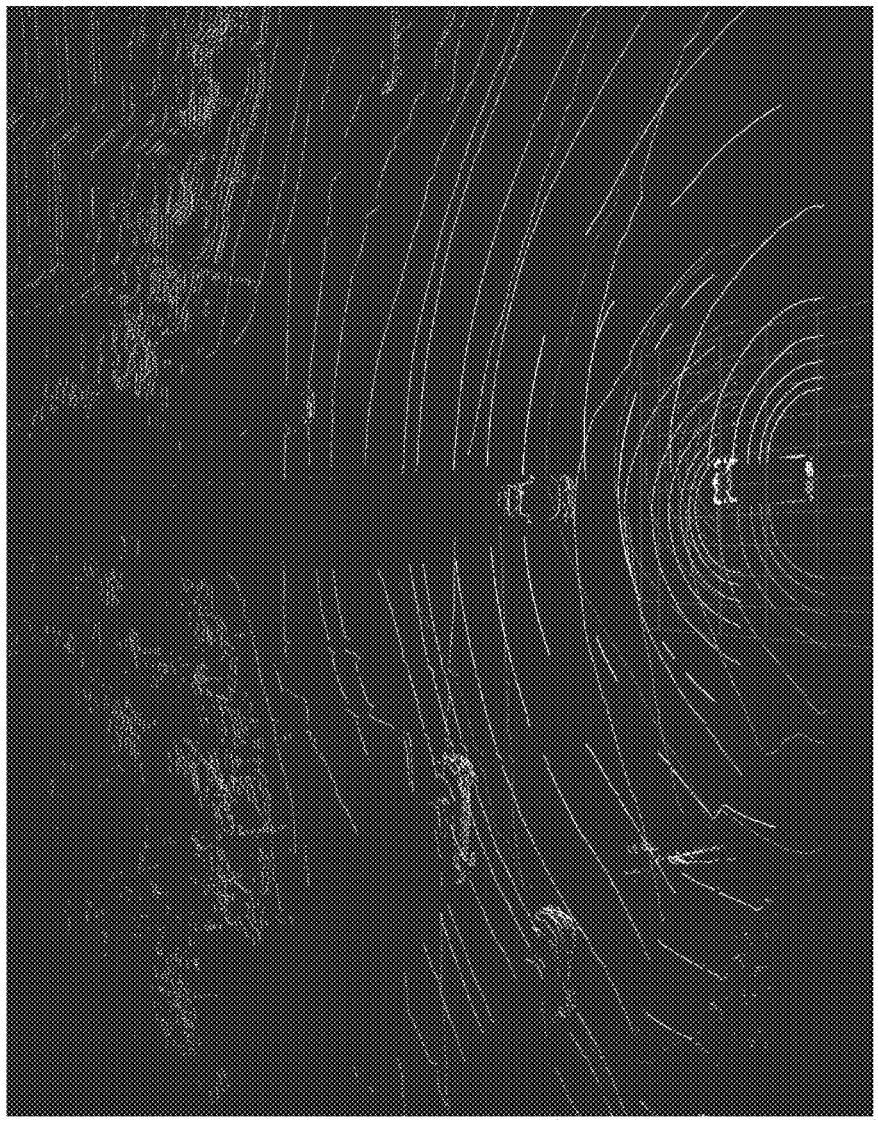

FIG. 7B illustrates a first phase of a single-phase angle LiDAR split during which all LiDAR sensors 100 are facing in a same direction, according to some embodiments of the present disclosure. FIG. 7C illustrates a second phase of the single-phase angle LiDAR split during which all LiDAR sensors 100 are facing in the opposite direction, according to some embodiments of the present disclosure. FIGS. 8A and 8B illustrate the captured cloud point during the first phase and the second phase, respectively, of the LiDAR rotation, according to some embodiments of the present disclosure. In FIGS. 8A-8B, each color represents a different LiDAR sensor.

Referring to FIGS. 7B-7C, in some embodiments, the scanning system 10 (e.g., an ego vehicle) includes 5 LiDAR sensors 100 and a controller 200 allowing for simultaneous triggering of the LiDAR rotations. According to some examples, a single 32-line LiDAR sensor 100-3 may be mounted on top of the platform 20 and four 16-lines LiDAR sensors 100-1, 100-2, 100-4, and 100-5 may be mounted in all 4 corners of the platform 20. In some embodiments, the system performs a single split per rotation (e.g., per 360 degrees/full rotation), which allows for consistent inter-lidar information without cutting too many objects of interests around the scanning system 10. However, embodiments of the present disclosure are not limited thereto, and the rotation may be cut/split into any suitable number of slices. Given that the areas of interest may be located in front or back of the platform 20, in some embodiments, the LiDAR point cloud may be split into a front slice and a rear slice. In some example, the LiDAR point cloud may also be cut in a left slice and a right slice of the environment, however, this may lead to more objects in the front and in the back of the platform 20 being cut in two. Splitting objects may make it harder for a 3D detection algorithm to consume the data and detect the objects at the boundary of the split. Given that it is more common to have cars driving in the same direction as the scanning system 10, the processor 300 may cut a higher number of vehicles when splitting the point cloud in the x/−x direction (e.g., into left and right splits) than when splitting the point cloud in the y or −y direction (e.g., into front and rear splits).

In the examples of FIGS. 7B and 7C, in which all LiDAR sensors 100 of the system 10 scan the same slice, all LiDARs face forward during a first phase (FIG. 7A) and face backward during a second phase. According to some embodiments, the half point clouds obtained by the scanning system 10 do not exhibit any shadowing or spatial discontinuity artifacts. That is, no shadowing effect may be observed on the objects in the scene whether they are static or dynamic, and no artifact may be observed at the cut angles (e.g., 90-degree or 270-degree angle) since no drastically temporally different points have been obtained from the various LiDAR sensors 100. In some embodiments, the result is a spatio-temporally consistent fused multi-LiDAR point cloud shown in FIGS. 8A and 8B. In FIGS. 8A-8B, which illustrates accurate vehicle boundaries with no shadowing effect, different colors correspond to different lidar sensors.

According to some embodiments, during each phase of the rotation, some of the LiDAR sensors 100 may be pointing in one direction, while other sensors may be pointing at the opposite phase angles.

As used herein, the when two or more sensors "face in the substantially same direction", are "phase locked at substantially the same phase angle", or are "phase locked at zero degree angles", the phase angles of the sensors may not be exactly identical, but may be within a narrow range of one another to account for timing constraints, calibration constraints, and/or the like. In some examples, the range may be 5 degrees, 2 degrees, or less. Similarly, when two sensors face in substantially opposite directions, their phases may be within a range of 180 degrees, which may account for timing constraints, calibration constraints, and/or the like. In some examples, the range may be 5 degrees, 2 degrees, or less.

Figure 9B:
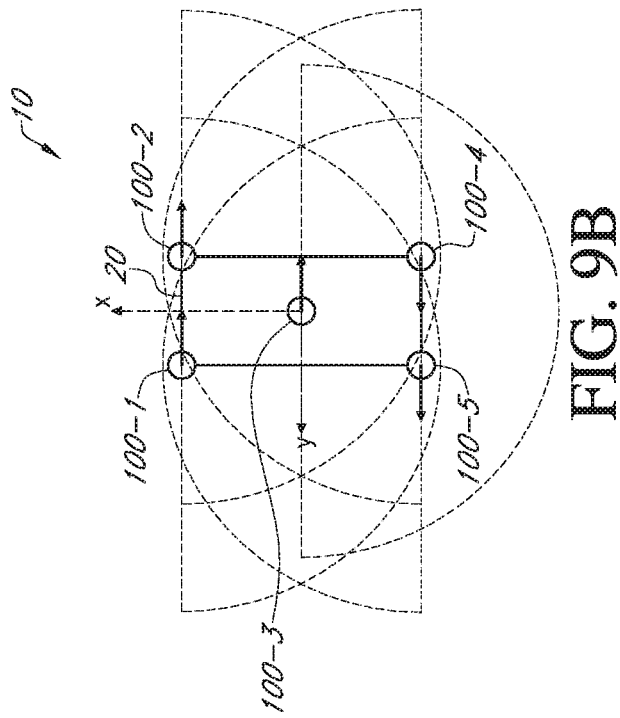
FIG. 9B illustrates a second phase of the dual-phase angle LiDAR split during which the first set of LiDAR sensors are facing in second direction and the second set of LiDAR sensors are facing in the first direction, according to some embodiments of the present disclosure.
Figure 9A:
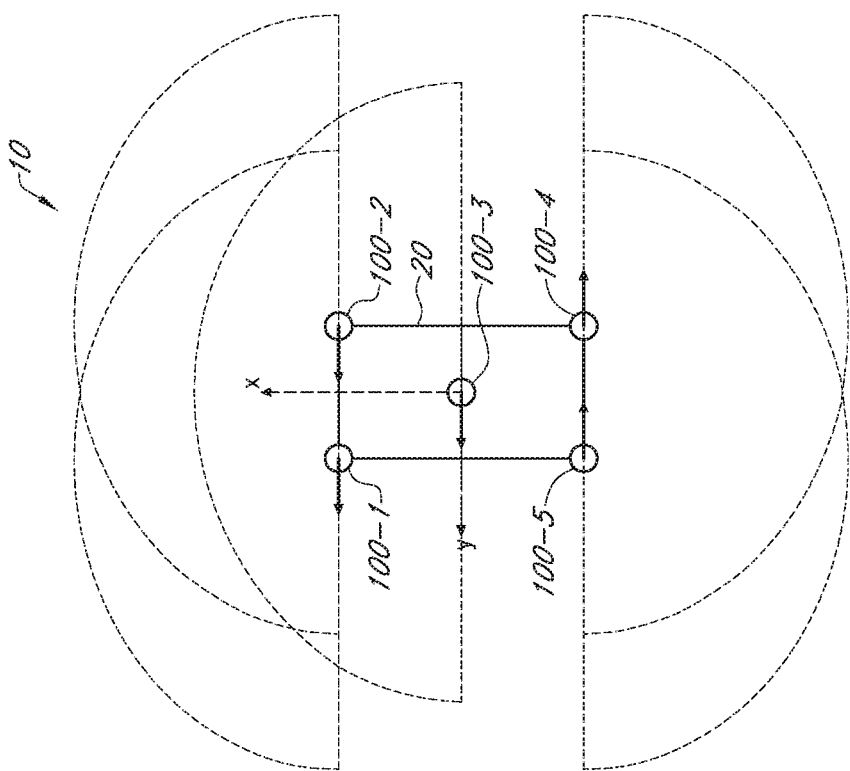
FIG. 9A illustrates a first phase of a dual-phase angle LiDAR split in which a first set of LiDAR sensors are facing in a first direction and a second set of LiDAR sensors are facing in a second direction opposite the first direction, according to some embodiments of the present disclosure.

FIG. 9A illustrates a first phase of a dual-phase angle LiDAR split in which a first set of LiDAR sensors 100 are facing in a first direction (e.g., the x direction) and a second set of LiDAR sensors 100 are facing in a second direction opposite the first direction (e.g., the −x direction), according to some embodiments of the present disclosure. FIG. 9B illustrates a second phase of the dual-phase angle LiDAR split during which the first set of LiDAR sensors 100 are facing in second direction and the second set of LiDAR sensors 100 are facing in the first direction, according to some embodiments of the present disclosure.

Referring to FIGS. 9A and 9B, according to some examples, three of the five LiDAR sensors (e.g., the two forward LiDAR sensors 100-1 and 100-2 and the top LiDAR sensor 100-3) are phase-locked to face in the forward direction and the remaining two sensors (e.g., the rear LiDAR sensors 100-4 and 100-5) are phase-locked to face backward during a first phase during a first rotational phase (FIG. 9A), and the three LiDAR sensors may face backward and the two rear LiDAR sensors face forward during a second rotational phase (FIG. 9B). A feature of this configuration is that each phase entails information about a large part of the 360 degrees field of view, while the point clouds obtained in this configuration offer spatio-temporal consistency with limited (e.g., minimal areas) subject to dynamic artifacts.

Figure 10A:
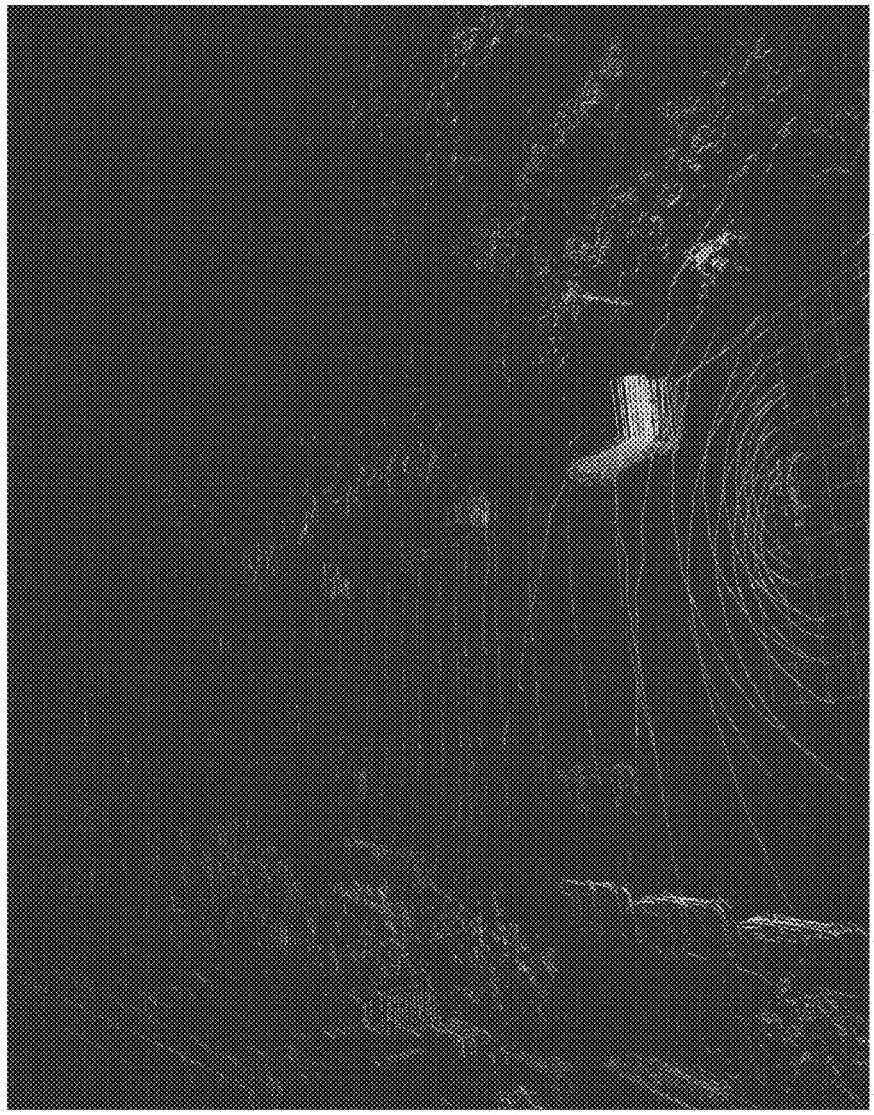
FIG. 10A illustrates the point cloud from the front and top sensors during the first phase of the rotation split, according to some embodiments of the present disclosure.
Figure 10B:
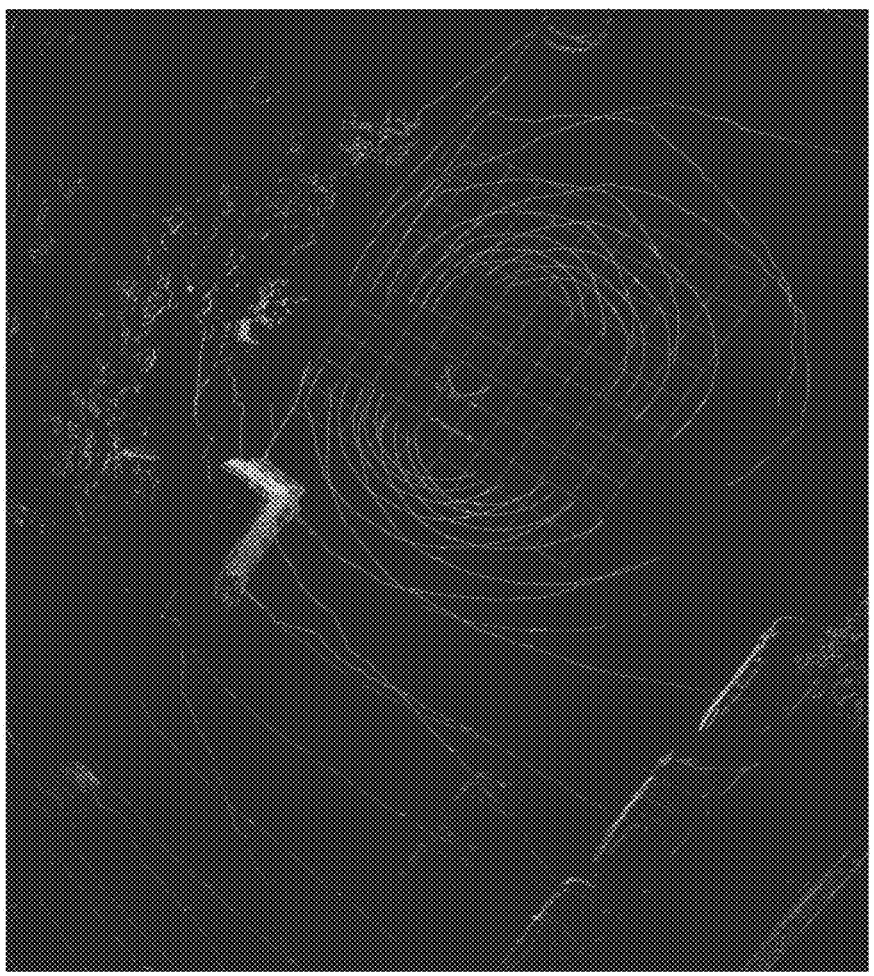
FIG. 10B illustrates the point cloud from the alternative top down view, according to some embodiments of the present disclosure.
Figure 10C:
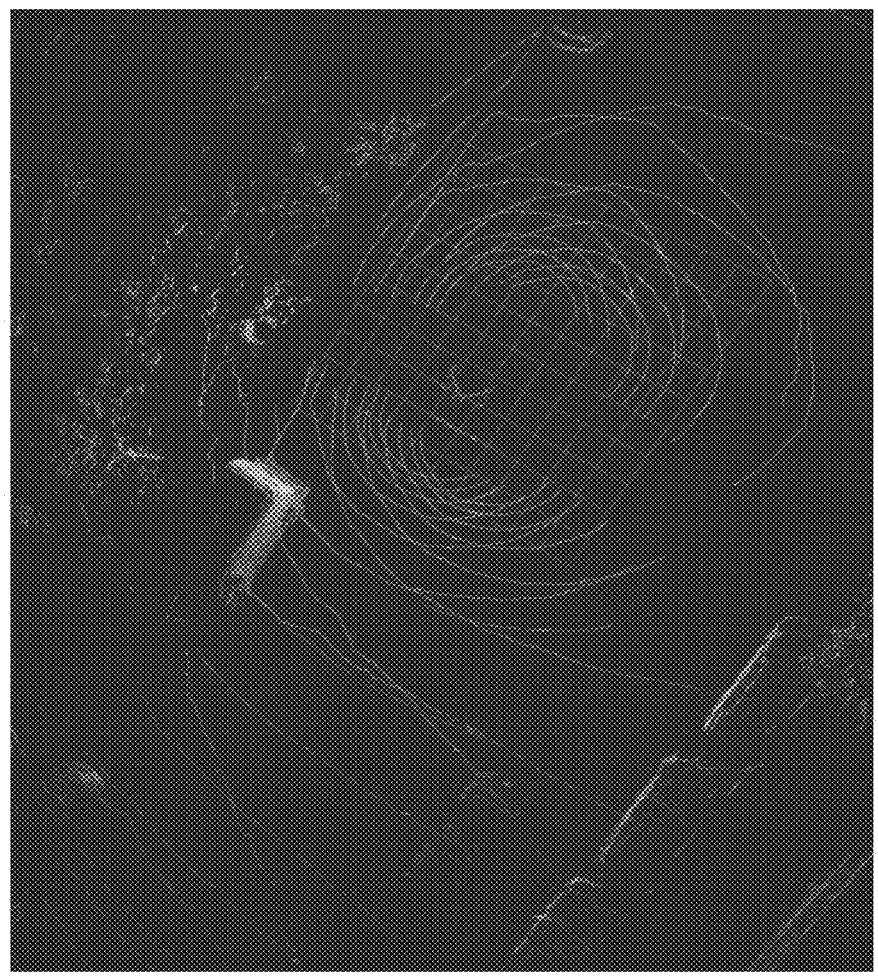
FIG. 10C illustrates the point cloud from the rear sensors during the first phase of the rotation split, according to some embodiments of the present disclosure.

FIG. 10A illustrates the point cloud from the front and top sensors during the first phase of the rotation split, according to some embodiments of the present disclosure; FIG. 10B illustrates the point cloud from the alternative top down view, according to some embodiments of the present disclosure; and FIG. 10C illustrates the point cloud from the rear sensors during the first phase of the rotation split, according to some embodiments of the present disclosure. In FIGS. 10A-10B, each color represents a different LiDAR sensor.

As described herein, the scanning system according to some embodiments provides a solution for spatio-temporal consistent multi-LiDAR point cloud. To mitigate temporal inconsistency between LiDARs, the scanning system according to some embodiments splits the 360 degrees point cloud at runtime and locks LiDAR sensors that are scanning the same part of the environment at the same phase angle. This prevents or substantially reduces instances of artifacts, such as shadowing of objects and inconsistent information in the regions of the cut angles, and also reduces the latency in an online processing pipeline as the data for the first slice can be processed as soon as that slice has been scanned and not at the end of the LiDAR rotation. Furthermore, the system allows for higher temporal accuracy of when the point cloud has been captured.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on", "directly connected to", "directly coupled to", or "immediately adjacent" another element or layer, there are no intervening elements or layers present.

As used herein, the terms "use", "using", and "used" may be considered synonymous with the terms "utilize", "utilizing", and "utilized", respectively.

The scanning system and/or any other relevant devices or components according to embodiments of the present disclosure described herein, such as the controller and processor, may be implemented by utilizing any suitable hardware, firmware (e.g., an application-specific integrated circuit), software, or any suitable combination of software, firmware, and hardware. For example, the various components of the scanning system may be formed on one integrated circuit (IC) chip or on separate IC chips. Further, the various components of the scanning system may be implemented on a flexible printed circuit film, a tape carrier package (TCP), a printed circuit board (PCB), or formed on the same substrate. Further, the various components of the scanning system may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

While this disclosure has been described in detail with particular references to illustrative embodiments thereof, the embodiments described herein are not intended to be exhaustive or to limit the scope of the disclosure to the exact forms disclosed. Persons skilled in the art and technology to which this disclosure pertains will appreciate that alterations and changes in the described structures and methods of assembly and operation can be practiced without meaningfully departing from the principles, and scope of this disclosure, as set forth in the following claims and equivalents thereof.

What is claimed is:

1. A scanning system comprising:
    a plurality of light detection and ranging (LiDAR) sensors, each LiDAR sensor of the plurality of LiDAR sensors being configured to generate a point cloud based on interactions of emitted light with a surrounding environment;
    a processor configured to split a full 360° rotation of each LiDAR sensor into a plurality of slices comprising a first slice and a second slice, to generate a coherent fused point cloud by fusing together portions of point clouds of the plurality of LiDAR sensors corresponding to the first slice, and fusing together portions of point clouds of the plurality of LiDAR sensors corresponding to the second slice, to determine an action for the scanning system to take in response to the generation of the coherent fused point cloud, and to cause the scanning system to implement the action; and
    a controller configured to control trigger times of rotations of the plurality of LiDAR sensors, and to phase lock first ones of the plurality of LiDAR sensors and to phase lock second ones of the plurality of LiDAR sensors.

2. The scanning system of claim 1, wherein the processor is configured to generate the coherent fused point cloud by:
    assigning a first timestamp to the portions of the point clouds of the plurality of LiDAR sensors corresponding to the first slice; and
    assigning a second timestamp to the portions of the point clouds of the plurality of LiDAR sensors corresponding to the second slice.

3. The scanning system of claim 2, wherein separately fusing together portions of the point clouds of the plurality of LiDAR sensors corresponding to the first slice and the second slice comprises:
fusing together ones of the point clouds associated with the first timestamp; and
separately fusing together ones of the point clouds associated with the second timestamp.

4. The scanning system of claim 1, wherein the first slice of each LiDAR sensor is earlier in rotation that the second slice, and
wherein the processor is configured to process the portions of the point clouds corresponding to the first slice, while the plurality of LiDAR sensors are capturing the portions of the point clouds corresponding to the second slice.

5. The scanning system of claim 1, wherein the controller is configured to phase lock the first ones of the plurality of LiDAR sensors at a substantially same phase angle and to phase lock the second ones of the plurality of LiDAR sensors at a substantially same phase angle.

6. The scanning system of claim 1, wherein, at any given time, the first ones of the plurality of LiDAR sensors face in a first direction and the second ones of the plurality of LiDAR sensors face a second direction substantially opposite the first direction.

7. The scanning system of claim 1, wherein, at any given time, the first and second ones of the plurality of LiDAR sensors face in a substantially same direction.

8. The scanning system of claim 1, wherein the plurality of LiDAR sensors are positioned at least two corners of the scanning system.

9. The scanning system of claim 1, wherein the scanning system comprises a vehicle, and
wherein the first and second slices respectively correspond to a front side and a rear side of the vehicle.

10. The scanning system of claim 1, wherein the scanning system comprises a vehicle, and
wherein the first and second slices respectively correspond to a left side and a right side of the vehicle.

11. A scanning system comprising:
a platform;
a plurality of light detection and ranging (LiDAR) sensors mounted on the platform, each LiDAR sensor of the plurality of LiDAR sensors being configured to generate a point cloud based on interactions of emitted light with a surrounding environment;
a controller configured to control trigger times of rotations of the plurality of LiDAR sensors, to phase lock first ones of the plurality of LiDAR sensors at a substantially same phase angle, and to phase lock second ones of the plurality of LiDAR sensors at a substantially same phase angle; and
a processor configured to split a full 360° rotation of each LiDAR sensor into a plurality of slices comprising a first slice and a second slice, and to generate a coherent fused point cloud by fusing together portions of point clouds of the plurality of LiDAR sensors corresponding to the first slice, and fusing together portions of point clouds of the plurality of LiDAR sensors corresponding to the second slice.

12. The scanning system of claim 11, wherein the processor is configured to generate the coherent fused point cloud by:
assigning a first timestamp to the portions of the point clouds of the plurality of LiDAR sensors corresponding to the first slice; and
assigning a second timestamp to the portions of the point clouds of the plurality of LiDAR sensors corresponding to the second slice.

13. The scanning system of claim 12, wherein separately fusing together portions of the point clouds of the plurality of LiDAR sensors corresponding to the first slice and the second slice comprises:
fusing together ones of the point clouds associated with the first timestamp; and
separately fusing together ones of the point clouds associated with the second timestamp.

14. The scanning system of claim 11, wherein the first slice of each LiDAR sensor is earlier in rotation that the second slice, and
wherein the processor is configured to process the portions of the point clouds corresponding to the first slice, while the plurality of LiDAR sensors are capturing the portions of the point clouds corresponding to the second slice.

15. The scanning system of claim 11, wherein, at any given time, the first ones of the plurality of LiDAR sensors face in a first direction and the second ones of the plurality of LiDAR sensors face a second direction substantially opposite the first direction.

16. The scanning system of claim 11, wherein, at any given time, the first and second ones of the plurality of LiDAR sensors face in a substantially same direction.

17. A method of generating a coherent fused point cloud by a scanning system comprising a plurality of light detection and ranging (LiDAR) sensors, the method comprising:
splitting a full 360° rotation of each LiDAR sensor of the plurality of LiDAR sensors into a plurality of slices comprising a first slice and a second slice, each LiDAR sensor being configured to generate a point cloud based on interactions of emitted light with a surrounding environment;
phase locking first ones of the plurality of LiDAR sensors at a substantially same phase angle and phase locking second ones of the plurality of LiDAR sensors at a substantially same phase angle; and
generating a coherent fused point cloud by separately fusing together portions of the point clouds of the plurality of LiDAR sensors corresponding to the first slice and the second slice.

18. The method of claim 17,
wherein the first and second ones of the plurality of LiDAR sensors face in a substantially same direction or in substantially opposite directions.

* * * * *